(12) United States Patent
Carro et al.

(10) Patent No.: US 11,144,318 B2
(45) Date of Patent: Oct. 12, 2021

(54) METHOD AND APPARATUS FOR APPLICATION THREAD PRIORITIZATION (71) Applicant: Arm Limited, Cambridge (GB)

(72) Inventors: Alejandro Rico Carro, Austin, TX (US); Joshua Randall, Austin, TX (US); Jose Alberto Joao, Austin, TX (US)

(73) Assignee: Arm Limited, Cambridge (GB)

( * ) Notice: Subject to any disclaimer, the term of this patent is extended or adjusted under 35 U.S.C. 154(b) by 204 days.

(21) Appl. No.: 16/550,644

(22) Filed: Aug. 26, 2019

(65) Prior Publication Data

US 2021/0064371 A1 Mar. 4, 2021

(51) Int. Cl.
| | | |
|---|---|---|
| G06F 9/46 | (2006.01) | |
| G06F 9/30 | (2018.01) | |
| G06F 9/52 | (2006.01) | |
| G06F 12/0842 | (2016.01) | |
| G06F 9/48 | (2006.01) | |
| G06F 9/50 | (2006.01) | |

(52) U.S. Cl.
CPC .......... *G06F 9/3009* (2013.01); *G06F 9/4812* (2013.01); *G06F 9/4881* (2013.01); *G06F 9/5027* (2013.01); *G06F 9/52* (2013.01); *G06F 12/0842* (2013.01)

(58) Field of Classification Search
CPC .... G06F 9/3009; G06F 9/4812; G06F 9/4881; G06F 9/5027; G06F 9/52; G06F 12/0842
See application file for complete search history.

(56) References Cited

U.S. PATENT DOCUMENTS

| | | | | |
|---|---|---|---|---|
| 6,212,544 B1* | 4/2001 | Borkenhagen | ........ | G06F 9/3009 712/E9.032 |
| 8,250,197 B2* | 8/2012 | Gulati | ............... | H04L 29/08099 709/223 |
| 8,881,169 B2* | 11/2014 | Abe | ..................... | G06F 11/0742 718/107 |
| 2007/0204137 A1* | 8/2007 | Tran | ........................ | G06F 1/324 712/214 |
| 2008/0288796 A1* | 11/2008 | Nakamura | ................. | G06F 1/32 713/320 |
| 2017/0364357 A1* | 12/2017 | Webber | ............... | G06F 9/30189 |

OTHER PUBLICATIONS

S. Hofmeyr, J. Colmenares, C. Iancu and J. Kubiatowicz, "Juggle: Proactive Load Balancing on Multicore Computers," HPDC'11, Jun. 8-11, 2011, San Jose, California, USA.

(Continued)

*Primary Examiner* — Gregory A Kessler
(74) *Attorney, Agent, or Firm* — Leveque IP Law, P.C.

(57) ABSTRACT

A method and apparatus for application thread prioritization to mitigate the effects of operating system noise is disclosed. The method generally includes executing in parallel a plurality of application threads of a parallel application. An interrupt condition of an application thread of the plurality of application threads is detected. A priority of the interrupted application thread is changed relative to priorities of one or more other application threads of the plurality of application threads, and control is returned to the interrupted application thread after the interrupt condition. The interrupted application thread then resumes execution in accordance with the changed priority.

17 Claims, 5 Drawing Sheets

(56) References Cited

OTHER PUBLICATIONS

K. Rangan, G. Wei, and D. Brooks, "Thread Motion: Fine-Grained Power Management for Multi-Core Systems," ISCA'09, Jun. 20-24, 2009, Austin, Texas, USA.
N. Markovic, D. Nemirovsky, O. Unsal, M. Valero and A. Cristal, "Thread Lock Section-Aware Scheduling on Asymmetric Single-ISA Multi-Core," IEEE Computer Architecture Letters, vol. 14, No. 2, Jul.-Dec. 2015.
Y. Turakhia, G. Liu, S. Garg and D. Marculescu, "Thread Progress Equalization: Dynamically Adaptive Power-Constrained Performance Optimization of Multi-Threaded Applications," in IEEE Transactions on Computers, vol. 66, No. 4, pp. 731-744, Apr. 1, 2017.

* cited by examiner

METHOD AND APPARATUS FOR APPLICATION THREAD PRIORITIZATION

BACKGROUND

The present disclosure relates generally to application thread prioritization, and more particularly, to a methodology and apparatus for mitigating the effects of operating system noise (OS) on application threads of a parallel application.

OS noise can have a detrimental effect on the performance of parallel applications, especially those that utilize static scheduling in parallel regions. When an application thread among a plurality of application threads executing in parallel is interrupted due to OS noise, the execution of the entire parallel region may be delayed.

In accordance with the present disclosure, there is provided a method and apparatus for mitigating the deleterious effects of OS noise on the performance of parallel applications.

BRIEF DESCRIPTION OF THE DRAWINGS

The present disclosure is illustrated by way of example and not limited in the accompanying figures in which like reference numerals indicate similar elements and in which.

DETAILED DESCRIPTION

Specific embodiments of the disclosure will now be described in detail regarding the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more thorough understanding of the disclosure. However, it will be apparent to those skilled in the art that the disclosure may be practiced without these specific details. In other instances, well-known features have not been described in detail to avoid unnecessarily complicating the description.

It is to be understood that the terminology used herein is for the purposes of describing various embodiments in accordance with the present disclosure and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period.

As used herein, the terms "about" or "approximately" apply to all numeric values, irrespective of whether these are explicitly indicated. Such terms generally refer to a range of numbers that one of skill in the art would consider equivalent to the recited values (i.e., having the same function or result). These terms may include numbers that are rounded to the nearest significant figure. In this document, any references to the term "longitudinal" should be understood to mean in a direction corresponding to an elongated direction of a personal computing device from one terminating end to an opposing terminating end.

A method and apparatus for application thread prioritization is disclosed. The method generally includes executing in parallel a plurality of application threads of a parallel application. An interrupt condition of an application thread of the plurality of application threads is detected. A priority of the interrupted application thread is changed relative to priorities of one or more other application threads of the plurality of application threads, and control is returned to the interrupted application thread after the interrupt condition. The interrupted application thread then resumes execution in accordance with the changed priority.

In accordance with an embodiment of the disclosure, thread prioritization is based upon quality-of-service (QoS), where a higher QoS priority value (QPV) associated with the interrupted application thread prioritizes the interrupted application thread.

In accordance with a further embodiment, a thread priority register (TPR) is set to a higher priority value in a core that has been interrupted prior to returning control to the interrupted application thread.

In accordance with yet another embodiment, corresponding priority values for the plurality of application threads are reset after each priority value of the application threads has achieved a maximum value.

In accordance with still another embodiment, the operating system does not change a priority of the interrupted application thread before returning control to the interrupted application thread when the parallel application is not statically scheduled.

In accordance with another embodiment, the priority associated with the interrupted application thread is changed when the parallel application is statically scheduled.

In accordance with still another embodiment, an operating system assumes all the application threads of the plurality of application threads are part of a parallel region in a statically scheduled case.

In accordance with yet another embodiment, the parallel application notifies the operating system that the application threads of the plurality of application threads are part of a parallel region in a statically scheduled case and the operating system sets priorities of only the plurality of application threads of the parallel region.

In accordance with still another embodiment, the parallel application notifies progress of the plurality of application threads to the operating system.

In accordance with yet another embodiment, the TPR priority value is changed based upon lag of the interrupted application thread relative to other application threads among the plurality of application threads.

In accordance with a further embodiment, thread prioritization of the plurality of application threads is implemented by at least one of cache partitioning, fine-grained dynamic voltage and frequency scaling (DVFS), logic reconfiguration and fetch/dispatch/issue arbitration within a simultaneous multithreading (SMT) core.

In accordance with still another embodiment, the operating system sets a timer to track a time during which the interrupted application thread has a higher priority relative to priorities of the one or more other application threads of the plurality of application threads, and reduces the priority of the interrupted application thread to a previous value after expiry of a defined time.

In accordance with yet another embodiment, the operating system periodically lowers the priority values of one or more of the plurality of application threads.

In accordance with another embodiment, there is provided an apparatus that includes an operating system that detects an interrupt condition of one of a plurality of application threads of a parallel application executing in parallel and a processor having a core with a thread priority register (TPR). Responsive to detection of the interrupt by the operating system, the thread priority register (TPR) is set to a higher priority value in the core of the processor to change a priority of the interrupted application thread relative to a priority for the other application threads among the plurality of application threads, where the operating system returns control to the interrupted application thread after the interrupt condition and the interrupted application thread resumes execution in accordance with the changed priority.

In accordance with another embodiment, a higher QPV prioritizes arbitration in a network on chip (NoC) and the QPV is received by a last-level cache and a memory controller.

Figure 1A:
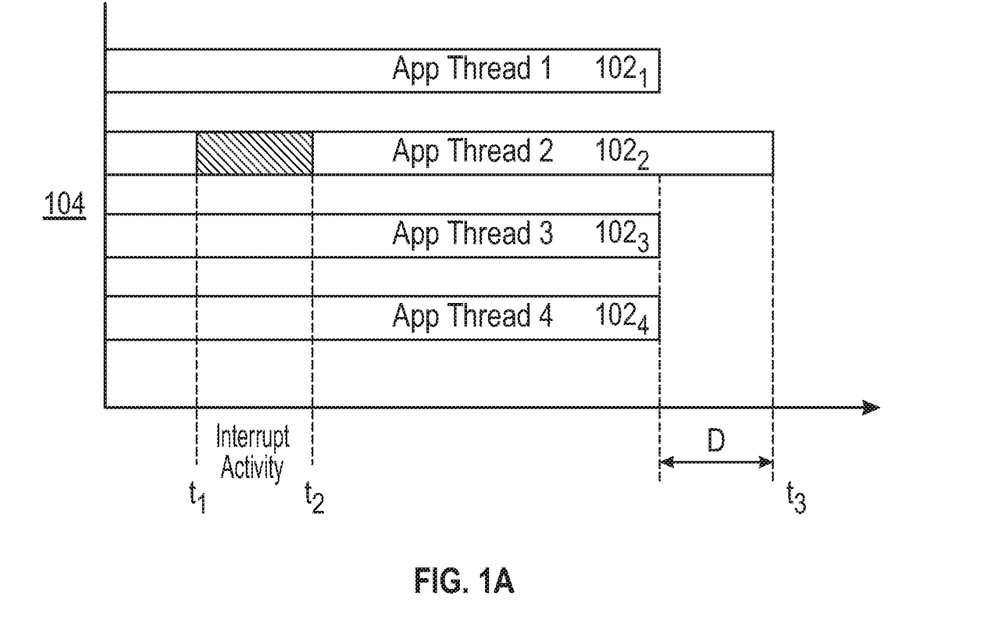
FIGS. 1A and 1B are general timing diagrams of a plurality of application threads of a parallel application executing in parallel by a processor and application thread prioritization in accordance with an embodiment of the disclosure.
Figure 1B:
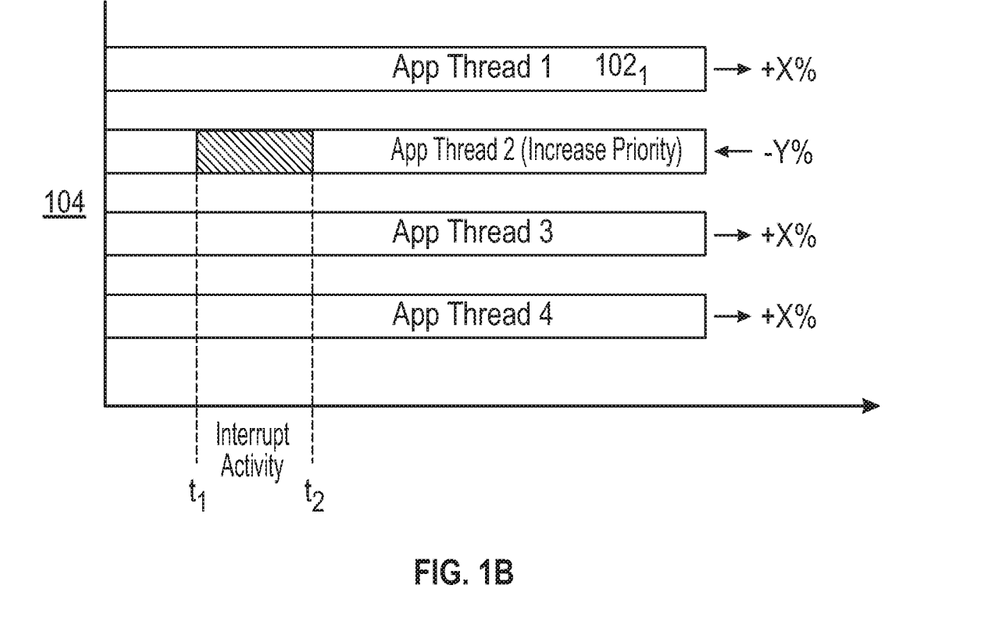

FIG. 1A is a general timing diagram 100 of a plurality of application threads $102_1$, $102_2$, $102_3$, and $102_4$ of a parallel application 104 executing in parallel by a processor. For the purpose of illustration, four application threads are depicted, but the number of threads may be represented by $102_1, \ldots, 102_N$. In such a parallel application 104, parts of the application 104 are broken into the discrete application threads $102_1, \ldots, 102_N$ that are processed simultaneously. In this manner, the computational tasks of the parallel application are broken down into a plurality of sub-tasks that can be processed independently. Each application thread among the plurality of application threads $102_1, \ldots, 102_N$ consists of a series of program instructions that can be executed by multiple resources. The term "multiple resources" may be classified as a multi-core and/or multi-processor computing device having a plurality of processing elements, or a cluster of networked computing devices. The overall process is controlled by an operating system (OS) that combines the computations/results of each thread upon completion. In the example representation shown in FIG. 1A, application thread $102_2$ is interrupted starting at time $t_1$. This interrupt condition, which can be caused by OS noise, is detected by the OS. The interrupt (for the period until control is returned to application thread $102_2$ at $t_2$) causes processing of application thread $102_2$ to incur a delay "D", consequently delaying execution of the entire parallel application 104 until time $t_3$. This undesirable condition may be alleviated in accordance with embodiments of the disclosure as illustrated in FIG. 1B., In accordance with embodiments of the disclosure, the priority of the interrupted application thread $102_2$ can be changed (e.g., increased) relative to the priorities of one or more of the other application threads $102_1$, $102_3$, and $102_4$. In this manner, when the OS returns control to the interrupted application thread $102_2$, the interrupted application thread $102_2$ resumes execution in accordance with the changed priority relative to the one or more application threads $102_1$, $102_3$, and $102_4$. As shown in the example of FIG. 1B, the time of execution for the interrupted application thread $102_2$ executing in accordance with the changed priority is reduced by $-Y$ % from the original delay D that was attributable to the interrupt condition. Consequently, the times of execution of the one or more uninterrupted application threads $102_1$, $102_3$, and $102_4$ are changed by $+X$ %, where the total delay of execution of the parallel application 104 is now less than D.

Figure 2:
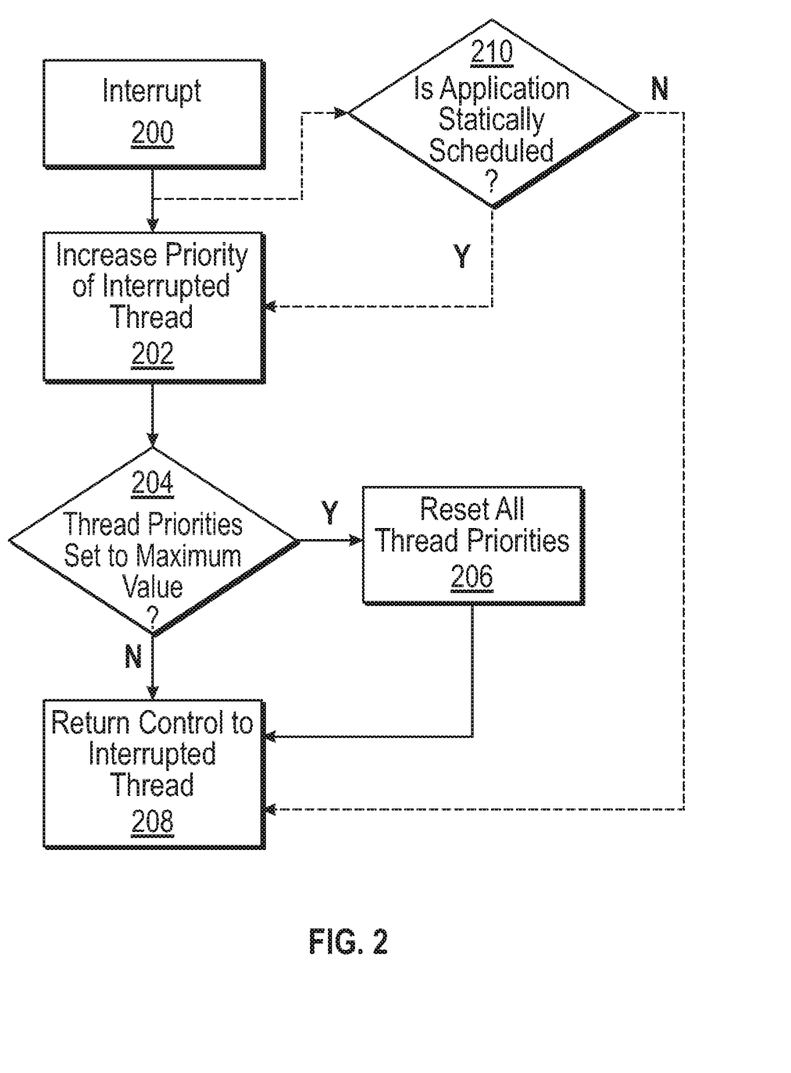
FIG. 2 is a flow diagram of a method of application thread prioritization in accordance with an embodiment of the disclosure.

FIG. 2 is a flow diagram of a method of application thread prioritization in accordance with an embodiment of the disclosure. With reference to FIGS. 1B and 2, the method begins at block 200 where an interrupt of an application thread (e.g., $102_2$) is detected. In block 202, the priority of the interrupted application thread $102_2$ is changed (e.g., increased) relative to one or more application threads $102_1$, $102_3$, and $102_4$ of the parallel application 104 executing in parallel, for example, by setting a thread priority register (TPR) to a higher priority value in the core of a processor executing the interrupted application thread $102_2$. At decision block 204, if the application thread priorities for corresponding application threads $102_1$, $102_2$, $102_3$, and $102_4$ are set to a maximum value, then the process proceeds to block 206, where all thread priorities are reset. If all the application thread priorities for corresponding application threads $102_1$, $102_2$, $102_3$, and $102_4$ in decision block 204 are not set to a maximum value, then the process proceeds to block 208, where the OS returns control to the interrupted application thread $102_2$. Decision block 210 determines whether the parallel application 104 is statically scheduled. If yes, control proceeds to block 202, if not, then the process proceeds to block 208. This scheme reduces the overall delay for the entire parallel application 104 attributable to the interrupted application thread $102_2$ to a value less than the delay "D" that would have occurred as a result of the interrupt condition as described above.

Figure 3:
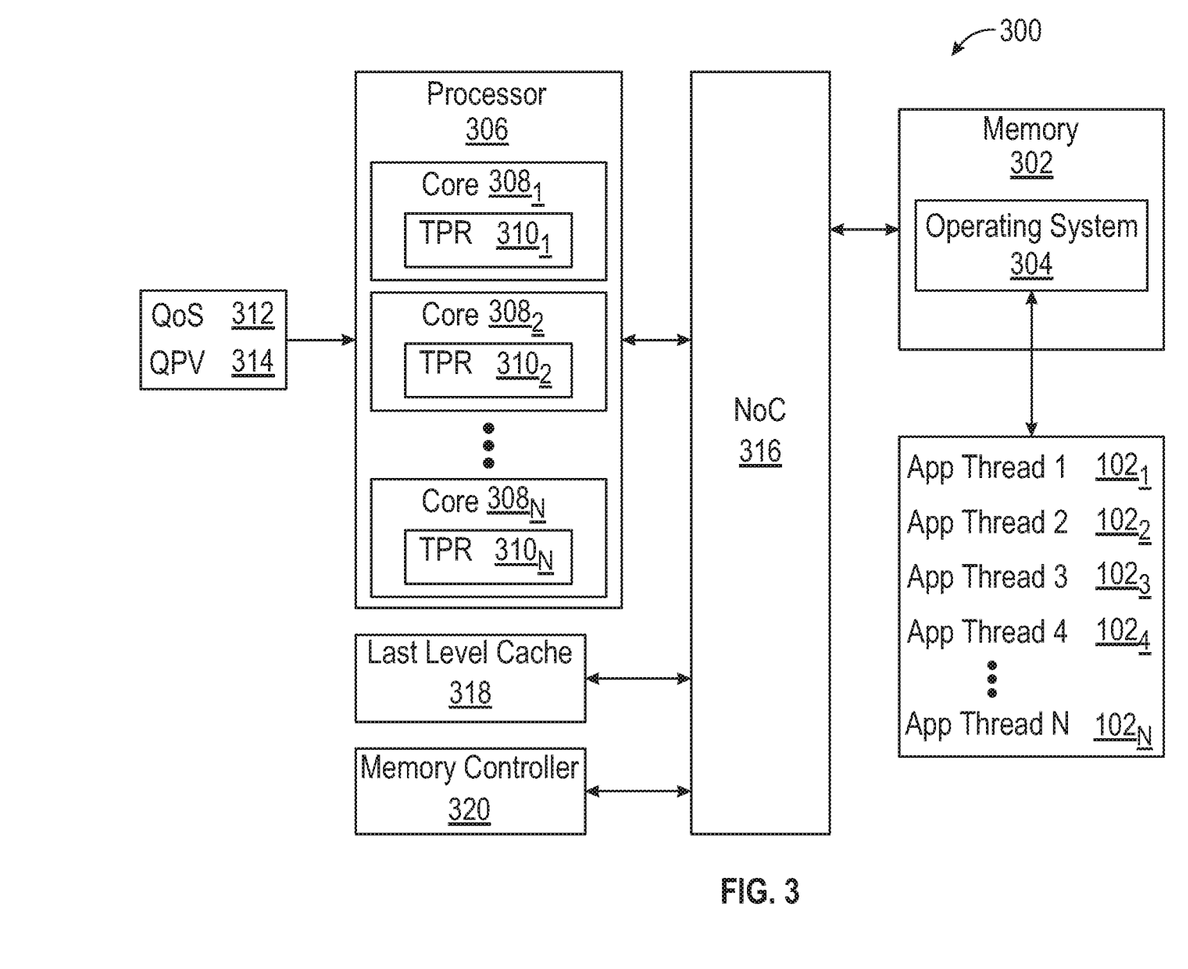
FIG. 3 is a high-level block diagram of an apparatus for application thread prioritization in accordance with an embodiment of the disclosure.

Referring now to FIG. 3, there is illustrated a high-level block diagram of an apparatus 300 for application thread prioritization in accordance with an embodiment of the disclosure. The apparatus 300 includes memory 302 having an OS 304 that executes on a processor 306. The memory 302 may include one or more of read-only memories (ROMs), random access memories (RAMs), EPROMs, EEPROMs, magnetic or optical elements, or any type of media suitable for storing electronic instructions. The processor 306 may consist of one or more individual processing units. In accordance with an embodiment, processor 306 includes a plurality of cores $308_1, 308_2, \ldots 308_N$. Each core has a respective TPR $310_1, 310_2, \ldots 310_N$. As described above, responsive to detection of the interrupt, OS 304 changes the TPR $310_1, 310_2, \ldots 310_N$ of a corresponding core $308_1, 308_2, \ldots 308_N$ to a higher priority value to change a priority of the interrupted application thread $102_2$ relative to a priority for the other application threads among the plurality of application threads $102_1, 102_3,$ and $102_4$ executing as illustrated in FIG. 1B. The OS 304 then returns control to the interrupted application thread $102_2$, which the processor 306 executes at the changed priority level. The number of application threads depicted in FIG. 1B is illustrative, as the application threads may be represented by $102_1, 102_2, 102_3, 102_4, \ldots 102_N$, where N is any suitable number of threads associated with the parallel application 104. As contemplated herein, the present disclosure is particularly useful in the context of a multi-core system, with each core running one or more threads.

In accordance with an embodiment, thread prioritization is based upon quality-of-service (QoS) 312, where a higher QoS priority value (QPV) 314 of an application thread prioritizes the application thread. A higher QPV may prioritize arbitration in a network on chip (NoC) 316, where the QPV 314 is received by a last-level cache 318 (i.e., the highest level cache shared by all functional units on the chip) and a memory controller 320. The OS 304 resets all corresponding priority values for the application threads $102_1, 102_2, 102_3,$ and $102_4$ (FIG. 1B) after all thread priorities are set to a maximum value as illustrated in the flow diagram of FIG. 2. In one example, the priority levels may be reset at the end of the parallel regions. In another embodiment, the OS 304 may employ a timer to track the time during which a thread has a higher priority and reduce the priority to the previous value after expiry of a defined time. Further, the priority values of all threads can be periodically lowered, in order to reduce QPV overflow situations. In a further embodiment, the OS 304 is configured such that it does not change a priority of the interrupted application thread before the OS returns control of the interrupted application thread $102_2$ when the parallel application 104 is not statically scheduled. Alternatively, the OS 304 changes the priority of the interrupted application thread $102_2$ when an application thread is statically scheduled. The OS 304 assumes all the application threads are part of a parallel region in a statically scheduled case. In another embodiment, the parallel application 104 notifies the OS 304 that the application threads are part of a parallel region in a statically scheduled case such that only the parallel application threads are executed by processor 306. The parallel application notifies progress of the application threads to the OS 304. In accordance with an embodiment, the OS 304 changes a TPR value in a corresponding TPR $310_1, 310_2, \ldots 310_N$ of the interrupted application thread $102_2$ based upon lag of the interrupted application thread relative to other application threads $102_1, 102_3,$ and $102_4$. In other embodiments, thread prioritization can be implemented by at least one of cache partitioning, fine-grained dynamic voltage and frequency scaling (DVFS), logic reconfiguration and fetch/dispatch/issue arbitration within a simultaneous multithreading (SMT) core.

Figure 4:
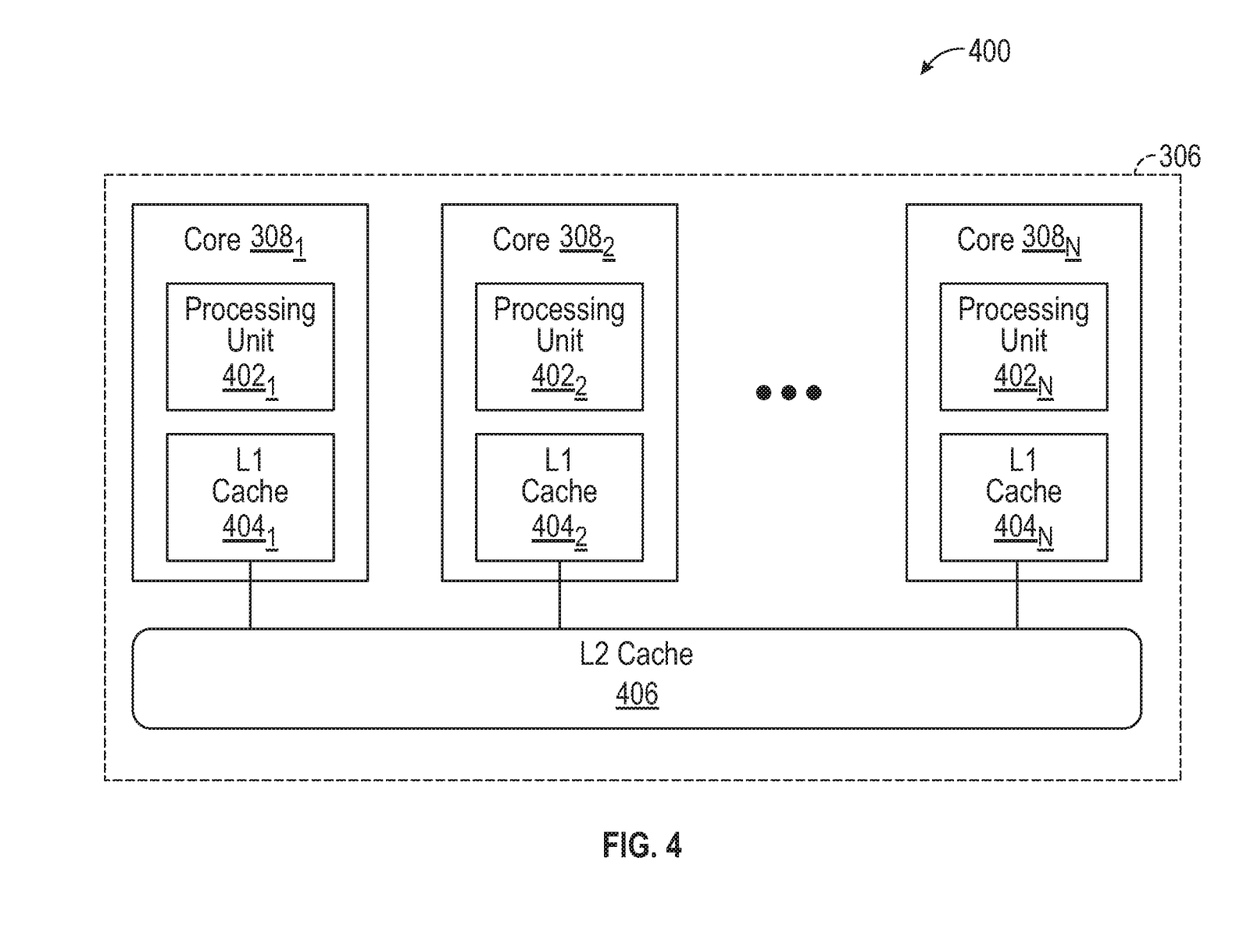
FIG. 4 is a cache-partitioning diagram for implementing thread prioritization.

Referring now to FIG. 4, there is depicted a general cache-partitioning diagram 400 where the individual cores $308_1, 308_2, \ldots 308_N$ of processor 306 (FIG. 3) contain respective processing units $402_1, 402_2, \ldots, 402_N$, corresponding L1 caches $404_1, 404_2, \ldots, 404_N$ and a shared L2 cache 406. The cache-partitioning mechanism changes the size of a partition corresponding to a thread based on the thread's priority. For example, the cache-partitioning mechanism assigns a larger partition to a thread with a larger priority (e.g., $102_2$ in FIG. 1) or increases the size of its partition based on its increased priority. This scheme provides a larger cache space to the thread with the larger priority, thus potentially increasing its performance over the rest of threads sharing that cache.

Figure 5:
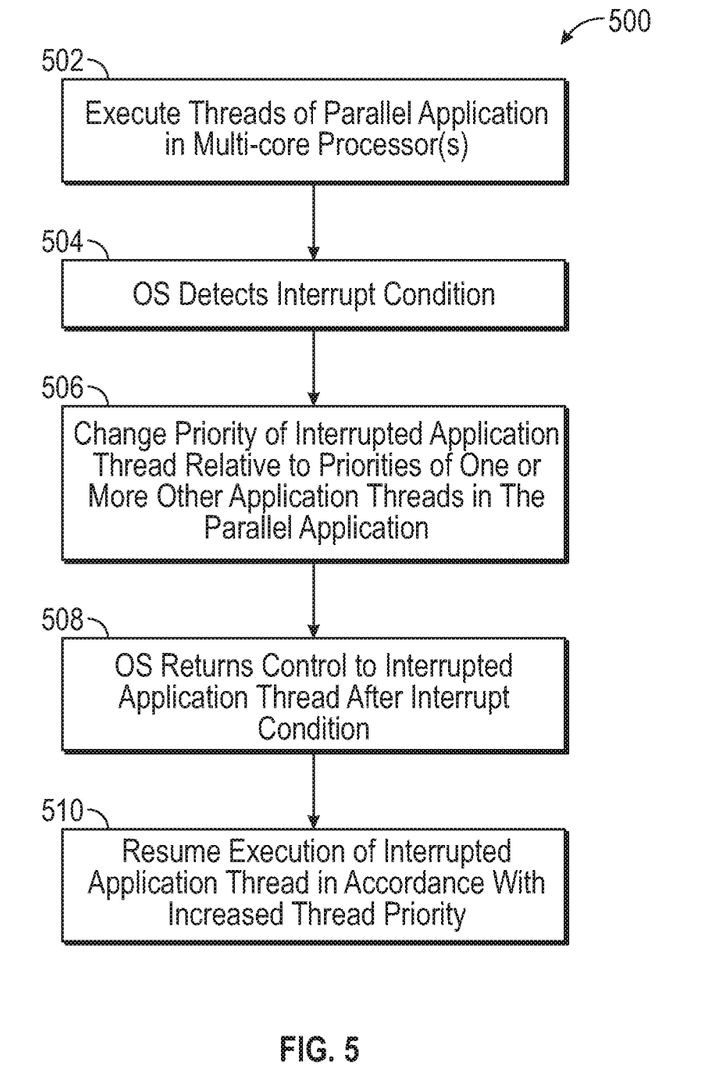
FIG. 5 is a flow diagram of a method of application thread prioritization in accordance with an embodiment of the disclosure.

Referring to FIG. 5, there is shown a high-level flow-diagram of a method 500 in accordance with an embodiment of the disclosure for application thread prioritization. In block 502, the plurality of application threads ($102_1, 102_2, \ldots, 102_N$) of the parallel application (104) are executed in parallel by a processor (306). In block 504, the OS detects an interrupt condition of an application thread (e.g., $102_2$) of the plurality of application threads ($102_1, 102_2, \ldots, 102_N$). In block 506, the OS changes a priority of the interrupted application thread ($102_2$) relative to priorities of one or more other application threads of the plurality of application threads $102_1, 102_2, \ldots, 102_N$. In block 508, the OS returns control to the interrupted application thread $102_2$ after the interrupt condition. The flow proceeds to block 510, where the interrupted application thread $102_2$ resumes execution in accordance with the changed priority.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "deriving" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Accordingly, embodiments and features of the present disclosure include, but are not limited to, the following combinable embodiments.

In one embodiment, a method of application thread prioritization includes executing in parallel a plurality of application threads of a parallel application; detecting an interrupt condition of an application thread of the plurality of application threads; changing a priority of the interrupted application thread relative to priorities of one or more other application threads of the plurality of application threads; returning control to the interrupted application thread after the interrupt condition; and resuming, by the interrupted application thread, execution in accordance with the changed priority.

In another embodiment, thread prioritization is based upon quality-of-service (QoS), where a higher QoS priority value (QPV) associated with the interrupted application thread prioritizes the interrupted application thread.

In another embodiment, the method further comprises setting a thread priority register (TPR) to a higher priority value in a core that has been interrupted prior to returning control to the interrupted application thread.

In another embodiment, the method further comprises resetting corresponding priority values for the plurality of application threads after each priority value of the application threads has achieved a maximum value.

In another embodiment, the method further comprises not changing a priority of the interrupted application thread before returning control to the interrupted application thread when the parallel application is not statically scheduled.

In another embodiment, the method further comprises increasing the priority associated with the interrupted application thread when the parallel application is statically scheduled.

In another embodiment, an operating system assumes all the application threads of the plurality of application threads are part of a parallel region in a statically scheduled case.

In another embodiment, the method further comprises the parallel application notifying an operating system that the application threads of the plurality of application threads are part of a parallel region in a statically scheduled case and the operating system sets priorities of only the plurality of application threads of the parallel region.

In another embodiment, the method further comprises the parallel application notifying progress of the plurality of application threads to an operating system.

In another embodiment, a thread priority register (TPR) priority value is changed based upon lag of the interrupted application thread relative to other application threads among the plurality of application threads.

In another embodiment, thread prioritization of the plurality of application threads is implemented by at least one of cache partitioning, fine-grained dynamic voltage and frequency scaling (DVFS), logic reconfiguration and fetch/dispatch/issue arbitration within a simultaneous multithreading (SMT) core.

In another embodiment, the method further comprises setting a timer to track a time during which the interrupted application thread has a higher priority relative to priorities of the one or more other application threads of the plurality of application threads, and reducing the priority of the interrupted application thread to a previous value after expiry of a defined time.

In another embodiment, the method further comprises periodically lowering the priority values of one or more of the plurality of application threads.

In a further embodiment, an apparatus includes an operating system to detect an interrupt condition of one of a plurality of application threads of a parallel application; and a processor having a core with a thread priority register (TPR), where, responsive to detection of the interrupt, the operating system sets the thread priority register (TPR) to a higher priority value to change a priority of the interrupted application thread relative to a priority for other application threads among the plurality of application threads, and where the operating system returns control to the interrupted application thread after the interrupt condition and the interrupted application thread resumes execution in accordance with the changed priority.

In another embodiment, thread prioritization is based upon quality-of-service (QoS), where a higher QoS priority value (QPV) of an application thread prioritizes the application thread.

In another embodiment, a higher QPV prioritizes arbitration in a network on chip (NoC) and the QPV is received by a last-level cache and a memory controller.

In another embodiment, the operating system resets all corresponding priority values for the application threads after all thread priorities are set to a maximum value.

In another embodiment, the operating system does not change a priority of the interrupted application thread before the operating system returns control of the interrupted application thread when the parallel application is not statically scheduled.

In another embodiment, the operating system changes the priority of the interrupted application thread when an application thread is statically scheduled.

In another embodiment, thread prioritization is implemented by at least one of cache partitioning, fine-grained dynamic voltage and frequency scaling (DVFS), logic reconfiguration and fetch/dispatch/issue arbitration within a simultaneous multithreading (SMT) core.

In accordance with the foregoing, a method and apparatus for mitigating the effect of OS noise on parallel threads of a parallel application is disclosed. Having thus described the disclosure of the present application in detail and by reference to embodiments thereof, it will be apparent that modifications and variations are possible without departing from the scope defined in the claims.

What is claimed is:

1. A method of application thread prioritization, comprising:
executing in parallel a plurality of application threads of a parallel application;
detecting an interrupt condition of an application thread of the plurality of application threads;

changing a priority of the interrupted application thread relative to priorities of one or more other application threads of the plurality of application threads, including setting a thread priority register (TPR) to a higher priority value in a core that has been interrupted;

returning control to the interrupted application thread after the interrupt condition;

resuming, by the interrupted application thread, execution in accordance with the changed priority; and resetting corresponding priority values for the plurality of application threads after each priority value of the application threads has achieved a maximum value.

2. The method of claim 1, where thread prioritization is based upon quality-of-service (QoS), where a higher QoS priority value (QPV) associated with the interrupted application thread prioritizes the interrupted application thread.

3. The method of claim 1, further comprising not changing a priority of the interrupted application thread before returning control to the interrupted application thread when the parallel application is not statically scheduled.

4. The method of claim 1, where thread prioritization of the plurality of application threads is implemented by at least one of cache partitioning, fine-grained dynamic voltage and frequency scaling (DVFS), logic reconfiguration and fetch/dispatch/issue arbitration within a simultaneous multithreading (SMT) core.

5. The method of claim 1, further comprising setting a timer to track a time during which the interrupted application thread has a higher priority relative to priorities of the one or more other application threads of the plurality of application threads, and reducing the priority of the interrupted application thread to a previous value after expiry of a defined time.

6. The method of claim 1, further comprising periodically lowering the priority values of one or more of the plurality of application threads.

7. A method of application thread prioritization, comprising:

executing in parallel a plurality of application threads of a parallel application;

detecting an interrupt condition of an application thread of the plurality of application threads;

changing a priority of the interrupted application thread relative to priorities of one or more other application threads of the plurality of application threads, including increasing the priority associated with the interrupted application thread when the parallel application is statically scheduled;

returning control to the interrupted application thread after the interrupt condition; and resuming, by the interrupted application thread, execution in accordance with the changed priority.

8. The method of claim 7, where an operating system assumes all the application threads of the plurality of application threads are part of a parallel region in a statically scheduled case.

9. The method of claim 7, further comprising the parallel application notifying an operating system that the application threads of the plurality of application threads are part of a parallel region in a statically scheduled case and the operating system sets priorities of only the plurality of application threads of the parallel region.

10. The method of claim 7, further comprising the parallel application notifying progress of the plurality of application threads to an operating system.

11. The method of claim 10, where a thread priority register (TPR) priority value is changed based upon lag of the interrupted application thread relative to other application threads among the plurality of application threads.

12. An apparatus, comprising:

an operating system to detect an interrupt condition of one of a plurality of application threads of a parallel application; and a processor having a core with a thread priority register (TPR), where, responsive to detection of the interrupt, the operating system sets the thread priority register (TPR) to a higher priority value to change a priority of the interrupted application thread relative to a priority for other application threads among the plurality of application threads, where the operating system returns control to the interrupted application thread after the interrupt condition and the interrupted application thread resumes execution in accordance with the changed priority, and where the operating system resets all corresponding priority values for the application threads after all thread priorities are set to a maximum value.

13. The apparatus of claim 12, where thread prioritization is based upon quality-of-service (QoS), where a higher QoS priority value (QPV) of an application thread prioritizes the application thread.

14. The apparatus of claim 13, where a higher QPV prioritizes arbitration in a network on chip (NoC) and the QPV is received by a last-level cache and a memory controller.

15. The apparatus of claim 13, where the operating system does not change a priority of the interrupted application thread before the operating system returns control of the interrupted application thread when the parallel application is not statically scheduled.

16. The apparatus of claim 15, where the operating system changes the priority of the interrupted application thread when an application thread is statically scheduled.

17. The apparatus of claim 12, where thread prioritization is implemented by at least one of cache partitioning, fine-grained dynamic voltage and frequency scaling (DVFS), logic reconfiguration and fetch/dispatch/issue arbitration within a simultaneous multithreading (SMT) core.

* * * * *